Dec. 16, 1947.  P. F. DANEL  2,432,510

APPARATUS FOR UTILIZING THE ENERGY OF SEA WAVES

Filed Oct. 5, 1945  2 Sheets-Sheet 1

INVENTOR
PIERRE F. DANEL
BY George H. Corey
ATTORNEY

Patented Dec. 16, 1947

2,432,510

UNITED STATES PATENT OFFICE 2,432,510

APPARATUS FOR UTILIZING THE ENERGY OF SEA WAVES

Pierre F. Danel, Grenoble, France, assignor to Ateliers Neyret-Beylier & Piccard-Pictet (Societe Anonyme), Grenoble, France Application October 5, 1945, Serial No. 620,602
In France January 26, 1944

8 Claims. (Cl. 61—20)

The present invention relates to installations for converting the energy of sea waves into an economically useful form and is more particularly concerned with installations of this character in which the water of the sea or lake is lifted by the waves themselves to an elevation above the calm water level.

Installations of the general type with which the present invention is concerned comprise concentration canals provided with outwardly diverging side walls forming channels opening toward the sea. The waves from the sea enter each channel at its outer end and are increased in amplitude and propagation velocity as they travel inwardly therein. At the inner end of each canal, the waves dash against an inlet valve system through which they force a certain quantity of water into a reservoir. The inlet valve system is so arranged that return flow of water from the reservoir is prevented. The periodic energy of the incoming waves is thus absorbed and transformed into potential energy, stored in the head of water in the reservoir, which is then available for utilitarian purposes, for example, for the production of power by passing the water through turbines and returning it to the sea.

The power of such installations, proportional to the product of the quantity of water impounded by the height to which the water is raised, depends upon the amplitude of the waves, upon the direction of the waves, and upon the height to which the water is impounded. The efficiency of the installation also is a function of the height to which the water is impounded because the effectiveness of the concentration canal and impounding gate system varies with the head of water against which the canals are working. The efficiency of the impounding system reaches a maximum at a critical height $H_o$, the value of which depends primarily upon the design of the canals and their associated structure and it does not decrease substantially until the head against which the canals are working departs considerably from $H_o$.

Since the efficiency will reach a maximum at a particular head, $H_o$, it is desirable to equip the greater part of the installation to employ water at this elevation, and particularly, to install turbines whose efficiency is at a maximum at a head corresponding to $H_o$. It may be desirable under some conditions to equip a part of the installation for maximum efficiency at a fall which is greater than $H_o$, but, nevertheless, to utilize completely and to the best advantage the energy of the waves in the locality when their amplitude is within the chosen range, it is desirable to maintain the impounding head constant and to design the turbines to absorb exactly the entire output of the installation.

In installations of this character it sometimes happens that the intermittent discharge of water from the concentration canals sets up an objectionable oscillation or pulsation of the surface of the water in the storage reservoir.

The present invention has as an object the provision of a sea wave power installation of the character referred to which is of improved efficiency as contrasted with those heretofore known.

A further object of the invention is to provide an installation of the character referred to in which the head of water against which the canals work may be maintained more nearly constant, at the most desirable level, than has been possible heretofore.

A further object of the invention is to provide a water power installation of the character described in which the head of the water supply for the turbines or other utilization equipment may be maintained more nearly constant at the level for the greatest efficiency than has been possible heretofore.

A further object of the invention is to provide an improved method of operating wave power installations of the character referred to which will give an improved output and efficiency as contrasted with past practice.

A further object of the invention is to provide a sea wave power installation of the type described which is arranged to substantially suppress any objectionable oscillation or pulsation of the surface of the water supply for the turbines or other water consuming equipment.

In order to simplify the following discussion, it will be assumed that the accumulated water is employed to drive hydraulic turbines. It will be appreciated that the invention is equally applicable to other modes of utilization of the impounded water whenever it is of interest to obtain as much energy as possible; that is to say, to obtain as great a discharge as possible through as great a fall as possible over as long a period of time as possible.

In accordance with one feature of the invention, the installation is designed to include a first reservoir, into which the concentration canals discharge, so arranged that it may be placed in hydraulic communication at will with one or more water storage basins or with a second reservoir which directly supplies water to the turbines. Provision is made for connecting the water storage basins with the second reservoir independently of their connection to the first reservoir. The entire assemblage of storage basins, reservoirs, canals and turbines is so constructed that the accumulated water may rise therein substantially above the level which corresponds to the optimum impounding head for the concentration canals.

In accordance with another aspect of the invention, the first reservoir which is supplied by the concentration canals is divided into several compartments each fed by one or more canals and each capable of being hydraulically isolated from the others at will. The first reservoir is so arranged that it may be connected to discharge either directly into the second reservoir, which supplies the turbines, or into one or more of the water storage basins.

In accordance with another feature of the invention, the second reservoir which feeds the turbines may be divided into several compartments feeding different turbines and capable of being connected as desired either with the concentration canals or with the water storage basins.

In accordance with another feature of the invention, the installation is arranged so that it is possible to keep the water level in the second reservoir which communicates directly with the turbines close to the optimum level for the turbines independently of the water level in the water storage basins. This may be accomplished in some cases by permitting water to flow from a storage basin to a reservoir and thus in falling from one level to another creating a certain loss of head which may or may not as desired be absorbed, for example, by means of auxiliary turbines or other suitable equipment. The same result may be secured when one or both of the reservoirs are divided into compartments causing the different groups of concentration canals or turbines to operate at different water levels.

In accordance with another aspect of the invention, some or all of the various reservoirs described above, or a special auxiliary reservoir, is made sufficiently large to limit pulsation of the surface of the water in the installation to a negligible value.

The invention will be better understood from the following description of particular embodiments it may take, which is given by way of illustration and not of limitation, and from the accompanying drawings in which.

Figure 1:
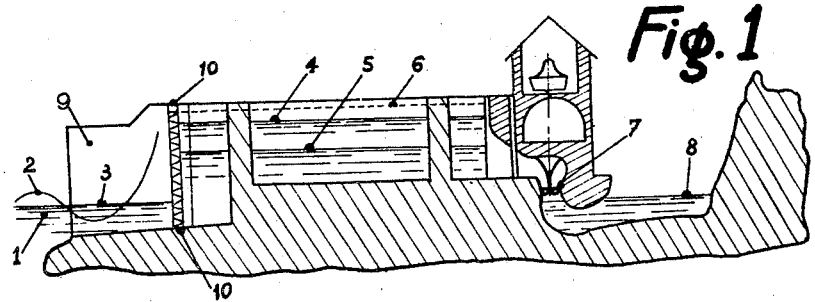
Fig. 1 is a vertical section, taken on the line 1—1 of Fig. 2, of a sea wave power installation constructed in accordance with certain aspects of the present invention.
Figure 2:
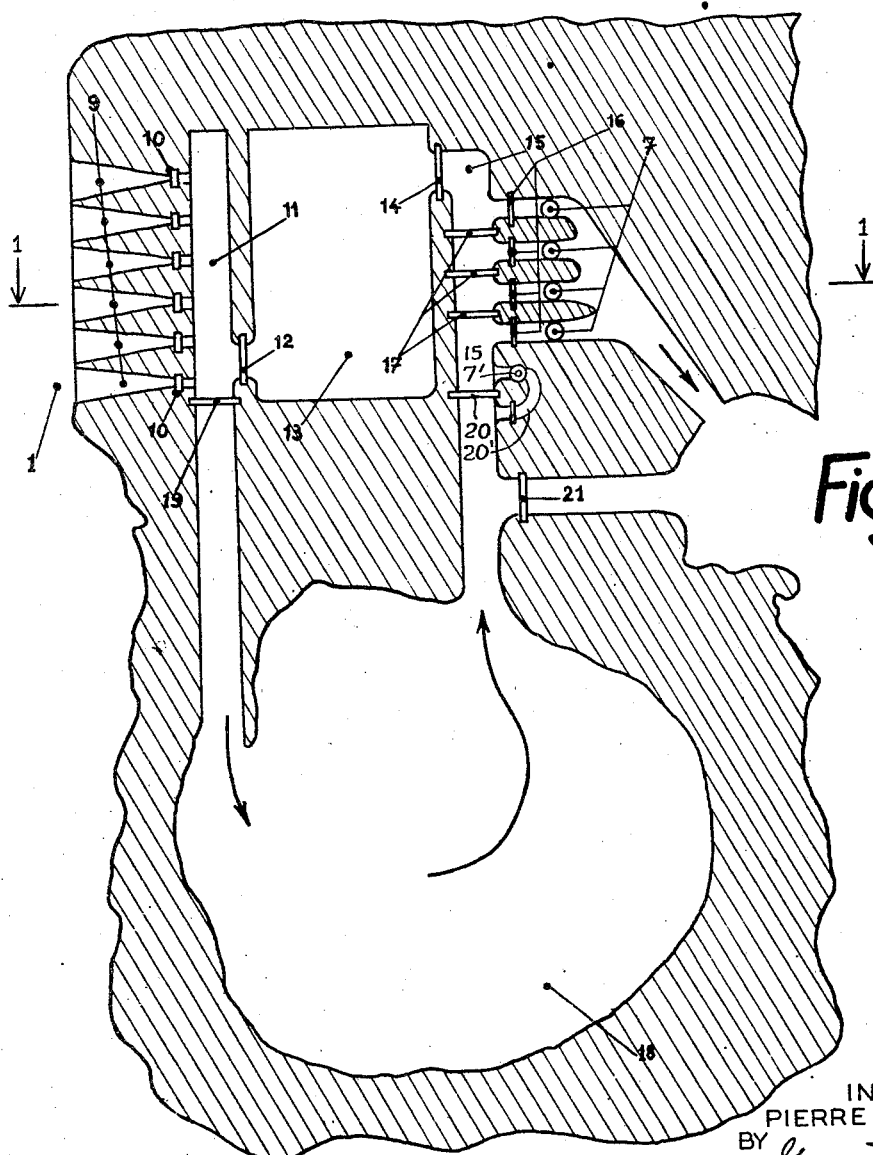
Fig. 2 is a horizontal section of the installation shown in Fig. 1.

In the arrangement of Figs. 1 and 2 the sea is indicated by the reference character 1, and the concentration canals at 9. The calm water level is indicated at 3 and the profile of the waves entering the canals 9 at 2. The water level for the optimum efficiency of the canals is indicated at 4, a very low water level at 5, and the maximum water level at 6. The turbines 7 for utilizing the impounded water discharge into a tail race 8. The level of the water in the tail race 8 is the same as the calm sea level. The waves arriving from the sea enter the concentration canals 9 and dash against the inlet gates 10 through which they force a certain amount of water which rises within the collecting reservoir 11 and is prevented from returning through the inlet gates. The collecting reservoir 11 corresponds to the first storage reservoir referred to above. The collecting reservoir 11 communicates by means of a water gate 12 with a relatively small auxiliary basin 13 which in turn communicates through a water gate 14 with the reservoir 15. This reservoir 15 corresponds to the second reservoir discussed above. It communicates directly with the turbines 7 through the inlet gates 16. If desired, the reservoir 15 may be divided into several compartments by valves or gates 17. Any oscillations or pulsations of the surface of the water which are not sufficiently suppressed in the collecting reservoir 11 will definitely disappear in the basin 13, especially since the water may pass from the canal 11 to the basin 13 only through the gate 12 which, because of its narrow width, will permit the passage of only very feeble pulsations.

The installation includes an additional and much larger water storage basin 18 which is in hydraulic communication on the one hand with the collecting reservoir 11 by means of the gate 19 and on the other hand with the reservoir 15 by means of the gate 20 and is in addition in communication with the tail race 8 by means of the gate 21.

Figure 3:
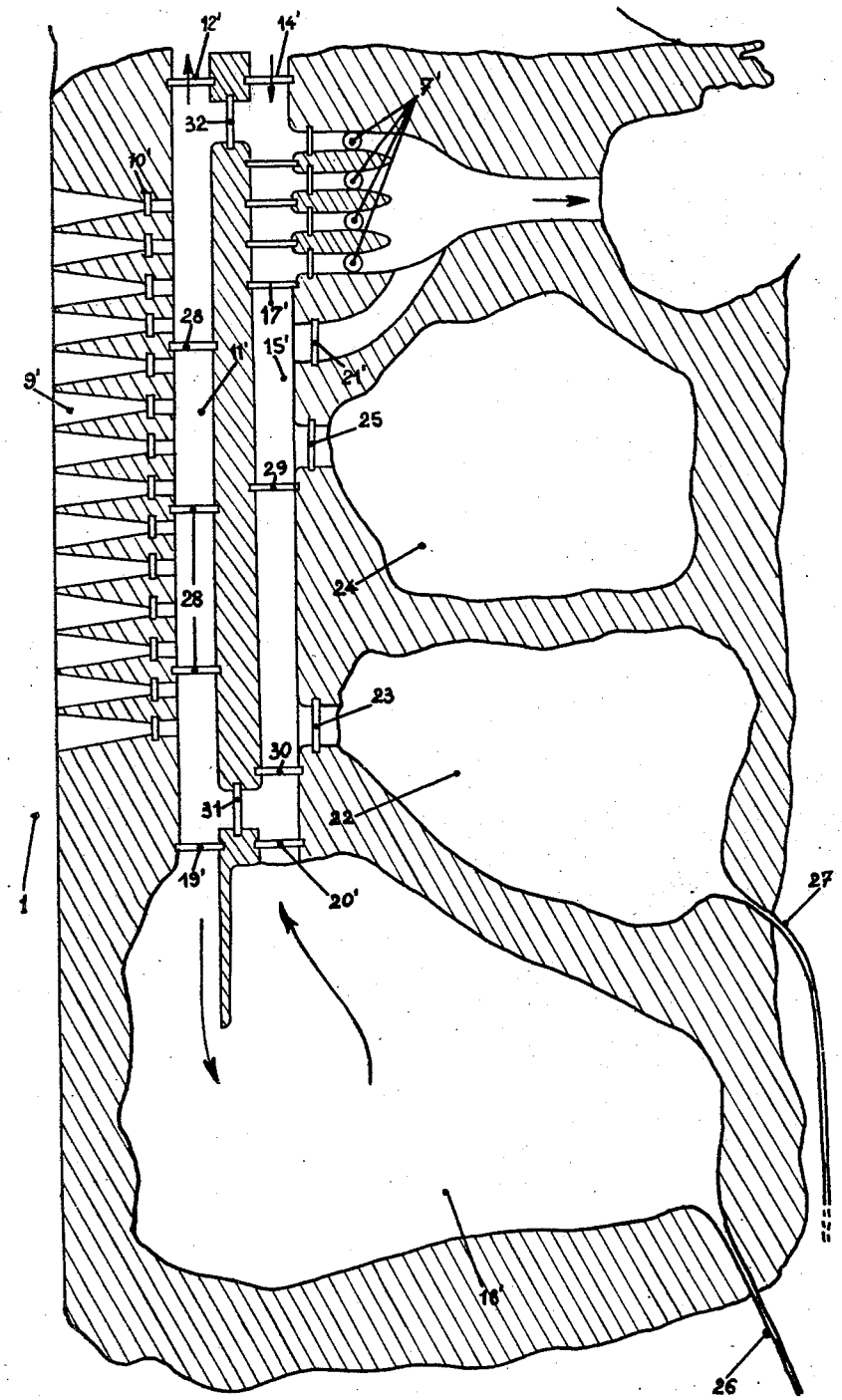
Fig. 3 is a horizontal section similar to Fig. 2 but showing a modified arrangement.

In the arrangement of Fig. 3 there is no reservoir corresponding to the small auxiliary basin 13 of Figs. 1 and 2, inasmuch as the reservoir 11', corresponding to the reservoir 11, is in this case sufficiently large to adequately suppress the pulsations from the concentration canals 9'. The gates 12' and 14' place the reservoirs 11' and 15' in communication with the sea at a point sheltered from the waves. In the arrangement of this figure there are other large storage basins in addition to the storage basin 18'. These include the basin 22 which is in communication with the chamber 15' through the gate 23 and the basin 24 which is in communication with the chamber 15' by means of the gate 25. The basins 18' and 22 are arranged to receive the discharge of water courses, indicated at 26 and 27. The reservoir 11' is provided with a series of gates 28 by means of which it may be divided into a number of individual compartments. Additional gates 29, 30, 31 and 32 are provided for selectively isolating the various reservoirs and basins.

In describing by way of illustration one manner in which the installation of Figs. 1 and 2 may be operated, it will be assumed first that the water level throughout the entire installation is established at the level 4, which is the level for the most effective impounding action, that the waves are of constant characteristics, that all of the different water receiving and storing chambers are in communication and that the load on the turbines is such that they will absorb exactly the delivery from all of the canals 9. If now the power demand on the turbines should decrease, the water discharged through them will decrease and the water level in the system will begin to rise. The water level may be permitted to continue to rise until the corresponding decrease in the delivery from the canals 9 causes the level to come to equilibrium. The gates leading to all of the various water storage basins are left open as the level rises so that the basins will be replenished. If an equilibrium should not be established before the water level reaches the maximum permissible level 6, water may be discharged through gate 21 into a spillway.

If the demand on the turbines increases after an equilibrium has been thus established at the level 6 or lower, the turbines will take more water and the level will begin to fall. It is desirable to cause the water level at the intake to the turbines to fall as rapidly as possible to the optimum level 4 and for this purpose the large water storage basin 18 is isolated by means of the gates 19 and 20. Since the reservoir 11 and the basin 13 have a relatively small surface area, the water level then will fall rapidly to the optimum level 4. At the same time, the reserve accumulated in the storage basin 18 is preserved. If the demand for power then continues above that which the concentrating canals 9 can continuously supply, this may be met from the water storage basin 18. It is desirable to maintain the level in the reservoirs 11 and 15 and the basin 13 as nearly as possible at the optimum level 4, and to attain this end the gate 20 may be opened only sufficiently to supply the additional water required. In this case, in order to avoid loss of the energy represented by the drop in level through the gate 20, this energy may be utilized to drive an auxiliary turbine, fed by a short passageway bypassing the gate 20. The drop in level at the gate 20 may also be utilized to supply a suitable means for increasing the effective head on one or more of the main turbines.

When gates 17 are provided for isolating the various turbines one from the other, it is also possible to supply some of the turbines at the level 4 from the reservoir 11 and the remainder of the turbines from the water storage reservoir 18 at a level between 4 and 6 until this latter level returns to the optimum level 4. Under some conditions it may be desirable that some of the turbines be designed for optimum efficiency at a head greater than the head represented by the water level 4, to permit a better output to be maintained during the times when the water level is above the level 4.

If the level of the storage basin 18 drops to the level 4 while the peak demand continues, communication may be re-established between all of the reservoirs and basins so that the level will fall as slowly as possible toward the level, indicated at 5, at which the available head no longer will permit the supply of the peak demand. If at this time the demand for power remains at its peak or returns to its initial level, the waves will not be able to meet it because of the low head in the reservoir 11. In this case the water storage basin 18 will again be isolated to permit the level in the reservoirs 11 and 15 and basin 13 to increase while at the same time temporarily decreasing the flow through the turbines until the delivery from the canals has increased the water level sufficiently to supply the necessary power. The water storage basin 18 will be replenished when the opportunity is provided by a drop in the demand for power.

In the above description of the operation of the installation, it has been assumed that the waves are of constant characteristics and that the demand for power varies. When contrary conditions exist or when both the waves and the demand vary, appropriate adjustments of the various gates will be made from time to time, following the same principles, to keep the level in the turbine supply reservoir as near as possible to the optimum level and to preserve the reserve supply of water in the storage basin.

It will be seen from the foregoing that the invention has the advantage of permitting rapid adaptation of the water level to changes in the operating conditions while at the same time permitting the accumulation of a substantial reserve water supply.

The modification of Fig. 3 lends itself to operation in a similar manner, with the further advantage of having a larger total water storage capacity. In addition, the water storage capacity is divided between several basins which permits a greater range of different combinations to be employed. In this modification, the reservoirs also may be divided into several compartments at will, which provides the possibility of operating the installation in the following manner:

When the demand on the turbines is less than the total power of the installation, a part only of the battery of canals 9' may be connected to supply the turbines by closing one of the gates 28 and closing the gates to the storage basins. The number of canals so employed will be selected so that the water level against which these canals are operating is at the most advantageous head. The remainder of the canals 9' are then employed to refill the storage basins. If the gates 28 had not been provided, then a certain loss would have been created between the reservoir 11 and the storage basin 18' in the case when the latter is at a level below the level 4. If the level in the basin 18' were above the level 4, it would have been necessary to tolerate this level throughout the installation with a certain corresponding loss of efficiency. However, this latter condition may be permitted at certain times of very low demand in order to refill the basins and at the same time be able to meet successive peak power demands.

If there should happen to be water courses in the neighborhood of the installation, it is desirable to cause them to discharge into the storage basins. In addition to increasing the total available water, this arrangement will provide a convenient method of cleaning the installation. The walls of the installation which are continually exposed to the sea water tend to become encrusted with marine organisms, shell fish, algae, and other obnoxious foreign materials. One of the storage reservoirs may be filled completely with fresh water from the water course and the installation periodically operated with water taken entirely from this basin, which will have the effect of destroying the organisms. In case the water course has only a very slight fall, it still may be adequate for cleaning purposes when in flood. Water from the water course should be secured at the highest elevation possible and for this purpose may be diverted from its natural channel to supply whichever of the storage basins is most suitable for this purpose. The numeral 27 indicates a diversion of the water course 26 to lead water from this course into the basin 22 which is capable of being filled to a higher level than the basin 18'.

It may be advantageous in some cases to provide a suitable canal for conducting the discharge from the water course directly to the reservoir 15' in order to be able to utilize directly the total available fall of the water course, even when the storage basin 22 is empty, by closing one of the gates 17.

When no water course is available it may be desirable to install a system for pumping fresh water from a suitable source in order to be able to flush out the installation periodically with fresh water.

The foregoing description of particular embodiments of the invention is made by way of disclosure and not of limitation. It will be appreciated that the invention may take other forms than those described in detail. For example, the connections between the various reservoirs and storage basins may be effected by suitable conduits or canals rather than by the water gates which have been described. The invention is not limited to use for the production of power but may be employed generally for raising water from the sea or from lakes. It will be appreciated that all of the many possible combinations of the several reservoirs and basins, under various conditions of demand on the turbines and of delivery from the concentrating canals, have not been described in detail but that these various combinations are included in the present invention.

The concentrating canals used in my installation are preferably constructed so as to embody the principles set forth in the co-pending application of Alphonse Gay, Serial No. 603,226, filed July 4, 1945.

I claim:

1. In an installation for converting the energy of sea waves into an economically useful form, which includes a concentration canal opening toward the sea and forming a channel for receiving the waves and increasing their amplitude and propagation velocity as they move inwardly therein, a reservoir at the inner end of the channel for receiving water therefrom, and an inlet gate between the channel and the reservoir for admitting water moved by the waves into the reservoir and preventing return flow from the reservoir to the channel, the improvement which includes a second reservoir for supplying water for consumption arranged to be optionally connected to the first reservoir to permit passage of water therebetween, and a water storage basin arranged to be optionally selectively connected with said reservoirs to permit passage of water between the basin and the reservoirs.

2. In an installation for converting the energy of sea waves into an economically useful form, the combination of a plurality of concentration canals opening toward the sea and forming channels for receiving the waves and increasing their amplitude and propagation velocity as they move inwardly therein, a reservoir at the inner ends of the channels for receiving water therefrom, inlet gates between the channels and the reservoir for admitting water moved by the waves into the reservoir and preventing return flow from the reservoir to the channels, means for dividing said reservoir into a plurality of compartments, a second reservoir for supplying water for consumption arranged to be connected with said first reservoir to permit passage of water from one reservoir to the other, and a water storage basin arranged to be optionally selectively connected with said reservoirs to permit passage of water between the basin and the reservoirs.

3. In an installation for the recovery from sea waves of energy in an economically useful form, the combination of a concentration canal opening toward the sea and forming a channel for receiving the waves and increasing their amplitude and propagation velocity as they move inwardly therein, a reservoir at the inner end of the channel for receiving water therefrom and an inlet gate between the channel and the reservoir for admitting water moved by the waves into the reservoir and preventing return flow from the reservoir to the channel, a second reservoir for supplying water for consumption arranged to be optionally connected with said first reservoir to permit passage of water between the reservoirs, means for dividing said second reservoir into a plurality of separate compartments each of which may supply water for consumption, a water storage basin, and means for optionally and selectively connecting the basin with said reservoirs to permit passage of water between the basin and the reservoirs.

4. In an installation for converting the energy of sea waves into an economically useful form, which includes a concentration canal opening toward the sea and forming a channel for receiving the waves and increasing their amplitude and propagation velocity as they move inwardly therein, a reservoir at the inner end of the channel for receiving water therefrom, and an inlet gate between the channel and the reservoir for admitting water moved by the waves into the reservoir and preventing return flow from the reservoir to the channel, the improvement which includes a second reservoir for supplying water for consumption arranged to be optionally connected to the first reservoir to permit passage of water therebetween, and a water storage basin arranged to be optionally selectively connected with said reservoirs to permit passage of water between the basin and the reservoirs, some one of said reservoirs and basin being sufficiently large to suppress objectionable pulsations of the surface of the water therein.

5. In an installation for converting the energy of sea waves into an economically useful form, which includes a concentration canal opening toward the sea and forming a channel for receiving the waves and increasing their amplitude and propagation velocity as they move inwardly therein, a first reservoir at the inner end of the channel for receiving water therefrom, and an inlet gate between the channel and the reservoir for admitting water moved by the waves into the reservoir and preventing return flow from the reservoir to the channel, the improvement which includes a second reservoir for supplying water for consumption arranged to be optionally connected to the first reservoir to permit passage of water therebetween, a plurality of water storage basins arranged to be selectively connected to one or the other of said reservoirs or to each other, means arranged to receive a flow of water from said second reservoir for generating energy from said flow, and means for optionally admitting water stored in one of said storage basins to said second reservoir and at the same time diverting water current received in the first reservoir to another of said water storage basins.

6. In an installation for converting the energy of sea waves into an economically useful form, the combination of a plurality of concentration canals opening toward the sea and forming channels for receiving the waves and increasing their amplitude and propagation velocity as they move inwardly therein, a first reservoir at the inner ends of the channels for receiving water therefrom, inlet gates between the channels and the reservoir for admitting water moved by the waves into the reservoir and preventing return flow from the reservoir to the channels, means for dividing said reservoir into a plurality of compartments each receiving water from a part only of said canals, a second reservoir for supplying water for consumption arranged to be connected with at least one of said compartments of said first reservoir to the exclusion of other of said compartments to permit passage of water from the selected compartment or compartments to said second reservoir, and a water storage basin arranged to be optionally selectively connected with said reservoirs to permit passage of water between the basin and the reservoirs, and means for establishing flow of water from at least one of the compartments of said first reservoir to said storage basin at a head independent of the head of the water flow from said first reservoir to said second reservoir.

7. In an installation for the recovery from sea waves of energy in an economically useful form, the combination of a concentration canal opening toward the sea and forming a channel for receiving the waves and increasing their amplitude and propagation velocity as they move inwardly therein, a first reservoir at the inner end of the channel for receiving water therefrom and an inlet gate between the channel and the reservoir for admitting water moved by the waves into the reservoir and preventing return flow from the reservoir to the channel, a second reservoir for supplying water for consumption arranged to be optionally connected with said first reservoir to permit passage of water between the reservoirs, means for dividing said second reservoir into a plurality of separate compartments each of which may supply water for consumption, a water storage basin, means for optionally and selectively connecting the basin with said reservoirs to permit passage of water between the basin and the reservoirs, a plurality of means arranged to receive a flow of water from said second reservoir for generating energy from said flow, and means for dividing said second reservoir into compartments each connecting with certain only of said generating means, whereby to permit simultaneous flow of water from said first reservoir through said second reservoir to certain of said generating means at one head while at the same time permitting flow from said storage basin through another compartment of said second reservoir to another of said generating means at the same or a different head.

8. In an installation for converting the energy of sea waves into an economically useful form, which includes a concentration canal opening toward the sea and forming a channel for receiving the waves and increasing their amplitude and propagation velocity as they move inwardly therein, a first reservoir at the inner end of the channel for receiving water therefrom, and an inlet gate between the channel and the reservoir for admitting water moved by the waves into the reservoir and preventing return flow from the reservoir to the channel, the improvement which includes a second reservoir for supplying water for consumption arranged to be optionally connected to the first reservoir to permit passage of water therebetween, a water storage basin arranged to be optionally selectively connected to one or the other of said reservoirs, and means interposed between said basin and one of said reservoirs for generating energy from a flow of water passing from said basin to said reservoir.

PIERRE F. DANEL.

REFERENCES CITED

The following references are of record in the file of this patent:

UNITED STATES PATENTS

| Number | Name | Date |
|---|---|---|
| 1,868,078 | Blair | July 19, 1932 |